April 17, 1951     K. H. BRANDT     2,548,862
CAPACITOR
Original Filed July 28, 1944
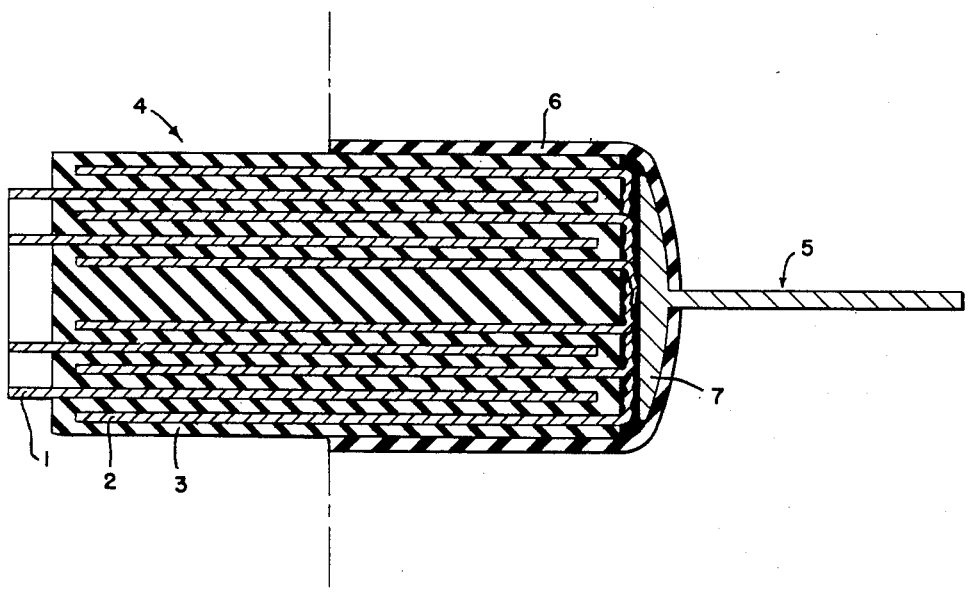
*INVENTOR.*
KRISTIAN H. BRANDT
BY Harry M. Saragovitz
*Attorney*

Patented Apr. 17, 1951

2,548,862

UNITED STATES PATENT OFFICE 2,548,862

CAPACITOR

Kristian H. Brandt, Red Bank, N. J.

Application April 16, 1945, Serial No. 588,506, which is a division of application Serial No. 547,094, July 28, 1944. Divided and this application April 23, 1946, Serial No. 664,181

1 Claim. (Cl. 175—41)

(Granted under the act of March 3, 1883, as amended April 30, 1928; 370 O. G. 757)

The invention described herein may be manufactured and used by or for the Government for governmental purposes, without the payment to me of any royalty thereon.

The present application is a division of my abandoned application on "Capacitors," filed April 16, 1945, and given Serial No. 588,506, which in turn was a division of my application on "Capacitors and Methods and Apparatus for Making the Same," filed July 28, 1944, which was given Serial No. 547,094 and has become U. S. Patent No. 2,531,389.

The present invention relates to capacitors of the rolled type.

Fixed capacitors are ordinarily made up in two forms. One comprises a stack of plates of metal conducting foil, separated by thin sheets of dielectric material, alternate layers of conducting foil being electrically joined. The other comprises two long strips of metal conducting foil, separated by dielectric material and rolled together so that one edge of one strip of foil is exposed for electrical connection at one end of the roll, and the opposite edge of the other strip is similarly exposed at the other end of the roll.

A good capacitor dielectric should be usable in very thin sheets so that capacitors may be made having relatively high capacity for their size. To be well suited to high frequency circuits, it should have a high dielectric strength to preclude it against puncture and resultant shorting of the capacitor, a low power factor and a relatively fixed dielectric constant over a wide frequency spectrum.

Certain types of glass or vitreous enamel possess excellent dielectric characteristics; this is particularly due to the fact that they can be produced in extremely thin films, such as of the order of .0015 to .005 inch in thickness without suffering the loss of its excellent dielectric characteristics. Likewise, the metallic conducting plates, which are applied in paste or liquid form, can be of the order of .0007 to .00175 inch in thickness. Of course, the materials may be used in my capacitors in thicknesses greater or less than those mentioned, but I believe that they result in eminently satisfactory practical capacitors which have extremely good electrical and mechanical characteristics and are well suited to replace capacitors using mica or paper dielectric, even were there no shortages of these materials.

Such thin films of vitreous enamels are used for making stacked type capacitors by building up alternate layers, in flat form, of "green" vitreous enamel and electrically conducting material and firing the resulting block into a monolithic structure while the layers remained in flat position.

The term "green" vitreous enamel is meant to indicate a certain intermediate stage which a film of vitreous enamel in liquid or paste form attains after having been submitted to a preliminary heating or baking. In this intermediate stage the vitreous enamel film will not flow and may be readily cut; on firing the green film in flat form it will uniformly and homogeneously shrink, but will not tend to distort or crack.

I now have found that films of green vitreous enamel can very advantageously be used in the manufacture of rolled type capacitors. The prior art has completely failed to recognize this possibility. One probable deterrent to the use of this excellent material for the manufacture of rolled type capacitors may have been the erroneous notion that a film of green vitreous enamel could not stand the stresses and strains which will develop in assembling superimposed layers of such green film and metallic foil into a roll.

The accompanying drawing shows an enlarged cross-sectional view of a rolled type capacitor, the left half showing the capacitor roll after the firing operation and the right half showing the finished capacitor.

The various steps of the process of manufacturing this capacitor and suitable machinery therefor are described in my copending application Serial Number 547,094, filed July 28, 1944.

The capacitor shown in the drawing consists of superimposed windings of alternate layers of electrically conducting material 1, 2, and vitreous enamel dielectric 3, wound while the enamel is still in the green state, and then fired into a roll 4 of monolithic structure. Electrical terminal wire leads 5 are soldered to the roll 4 by means of a metal disk 7 having a rounded back and a flat face, which has been previously tinned for soldering. The roll 4 is completely incased in a tubular envelope 6 of vitreous enamel.

The rolled type capacitor, above described, is comprised of two foils which have been coated with an initially flexible coating of vitreous enamel to the extent that most of the surface involved is coated except for narrow strips on opposite edges of the two foils which are rolled up into a cylindrical form. The free edges of the foils are crumpled against sides of the cylinder thus formed by means of the lead wire carrying discs which are held thereagainst by means of a solder bond. The entire assembly is completely covered by means of a fused vitreous envelope which covers the body of the roll, the outside of the conducting disc as well as a portion of the terminal leads.

The vitreous enamel to be used in the capacitors described in the present specification should have a melting point lower than the metal foil to be used, so that the enamel may be fired without melting the foil. Also it should be of a type which has good thermal shock resistance in addition to the electrical characteristics already set forth. Some of the silicate flint glasses, such as Schott, heavy silicate flint (International Critical Tables, volume 2, 1927, index number 102), might be used, but with modifications in the formulae, better electrical characteristics may be obtained. Also, the vitreous enamel used should preferably have substantially the same coefficient of expansion as the metal parts used so as to avoid breakage of the enamel due to temperature changes, both during manufacture and in use.

What is claimed is:

A fixed capacitor of the rolled type, comprising two metal foils in strip form having a predetermined length, a fused coating of initially flexible vitreous enamel applied on both sides of each of said foils, a narrow portion of said foils respectively on opposite edges thereof being free of said coating, said foils and coatings being in the form of a roll, said portions forming the ends of the roll and being compressed thereagainst, an electroconductive disc disposed adjacent said compressed portion, electroconductive means for bonding said discs to said compressed portions, a lead conductor secured to each disc, and a fused vitreous envelope covering said roll, said discs and a portion of said conductors.

KRISTIAN H. BRANDT.

REFERENCES CITED

The following references are of record in the file of this patent:

UNITED STATES PATENTS

| Number | Name | Date |
| --- | --- | --- |
| 1,467,777 | Demmler | Sept. 11, 1923 |
| 1,947,112 | Ruben | Feb. 13, 1934 |
| 2,211,583 | Ruben | Aug. 13, 1940 |
| 2,238,031 | Brennan | Apr. 15, 1941 |
| 2,321,439 | Verwey | June 8, 1943 |
| 2,386,634 | Robinson | Oct. 9, 1945 |
| 2,389,420 | Deyrup | Nov. 20, 1945 |
| 2,398,176 | Deyrup | Apr. 9, 1946 |